(12) United States Patent
Sakurai et al.

(10) Patent No.: US 8,254,083 B2
(45) Date of Patent: Aug. 28, 2012

(54) CERAMIC ELECTRONIC COMPONENT AND METHOD FOR PRODUCING SAME

(75) Inventors: Takashi Sakurai, Tokyo (JP); Shinya Yoshihara, Tokyo (JP); Ko Onodera, Tokyo (JP); Hisayuki Abe, Tokyo (JP); Masahiko Konno, Tokyo (JP); Satoshi Kurimoto, Tokyo (JP); Hiroshi Shindo, Tokyo (JP); Akihiro Horita, Tokyo (JP); Genichi Watanabe, Tokyo (JP); Yoshikazu Ito, Tokyo (JP)

(73) Assignee: TDK Corporation, Tokyo (JP)

( * ) Notice: Subject to any disclaimer, the term of this patent is extended or adjusted under 35 U.S.C. 154(b) by 233 days.

(21) Appl. No.: 12/851,106

(22) Filed: Aug. 5, 2010

(65) Prior Publication Data
US 2011/0051314 A1 Mar. 3, 2011

(30) Foreign Application Priority Data

Aug. 31, 2009 (JP) ................................ P2009-200236

(51) Int. Cl.
*H01G 4/06* (2006.01)
(52) U.S. Cl. ...................... 361/321.1; 361/311; 361/313; 361/321.2; 361/306.1; 361/306.3
(58) Field of Classification Search .............. 361/321.1, 361/301.2, 301.4, 311–313, 306.1, 306.3, 361/321.2, 321.4, 303–305
See application file for complete search history.

(56) References Cited

U.S. PATENT DOCUMENTS

| | | | |
|---|---|---|---|
| 6,320,738 B1 * | 11/2001 | Yamana et al. | 361/321.2 |
| 6,344,963 B1 * | 2/2002 | Mori | 361/306.3 |
| 6,522,521 B2 * | 2/2003 | Mizuno et al. | 361/321.4 |
| 6,627,120 B2 * | 9/2003 | Shimizu | 252/521.2 |
| 7,339,780 B2 * | 3/2008 | Sridharan et al. | 361/306.1 |
| 7,589,954 B2 * | 9/2009 | Kusano et al. | 361/321.4 |

FOREIGN PATENT DOCUMENTS

| | | |
|---|---|---|
| JP | A-5-175011 | 7/1993 |
| JP | A-2003-133158 | 5/2003 |
| JP | A-2006-026745 | 2/2006 |

OTHER PUBLICATIONS

Sep. 14, 2011 Office Action issued in Korean Application No. 10-2010-0080139.

* cited by examiner

*Primary Examiner* — Nguyen T Ha
(74) *Attorney, Agent, or Firm* — Oliff & Berridge, PLC

(57) ABSTRACT

There are provided a ceramic electronic component and a method for producing the ceramic electronic component, where a ground electrode layer can be directly coated with lead-free solder without lowering reliabilities. Terminal electrode 3 is provided with a ground electrode layer 21 of Cu having been formed by firing, a solder layer 22 formed of a lead-free solder based on five elements of Sn—Ag—Cu—Ni—Ge, and a diffusion layer 23 having been formed by the diffusion of Ni between the ground electrode layer 21 and the solder layer 22. Because the diffusion layer 23 of Ni is formed between the ground electrode layer 21 and the solder layer 22, the diffusion layer 23, which functions as a barrier layer, suppresses the solder leach of Cu from the ground electrode layer 21. The diffusion layer 23 of Ni can also suppress the growth of fragile intermetallic compounds of Sn—Cu. Therefore, a decrease in the bonding strength between the ground electrode layer 21 and the solder layer 22 can be prevented.

6 Claims, 11 Drawing Sheets

Fig.6
(a)
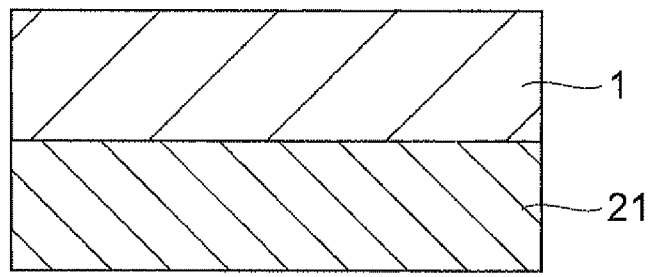
(b)
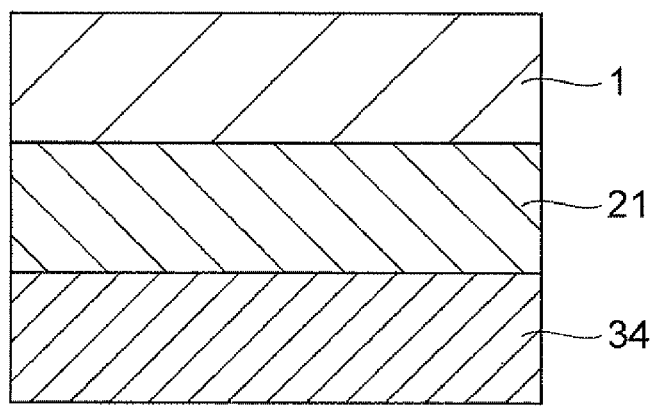
(c)
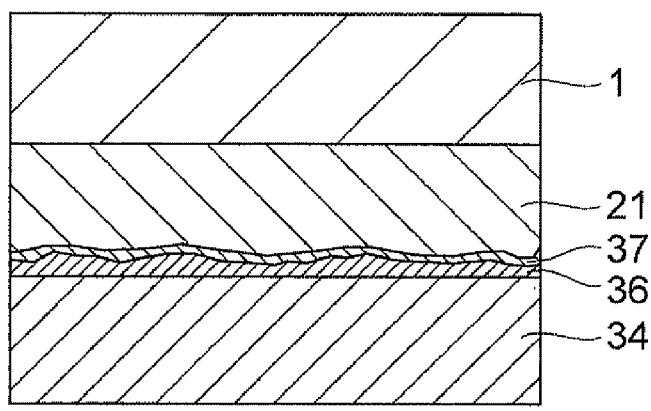

Fig.7
(a)
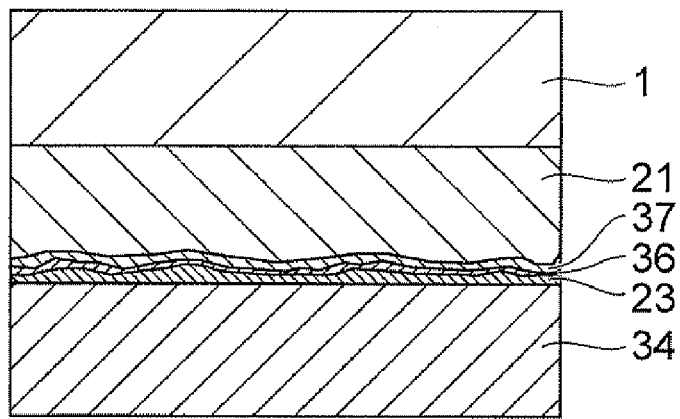
(b)
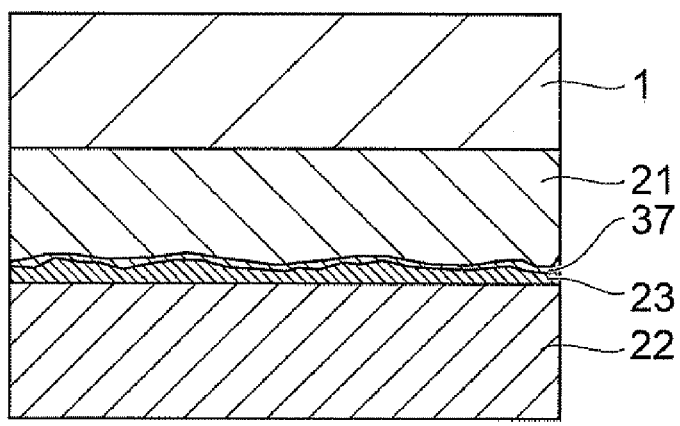

Fig.8
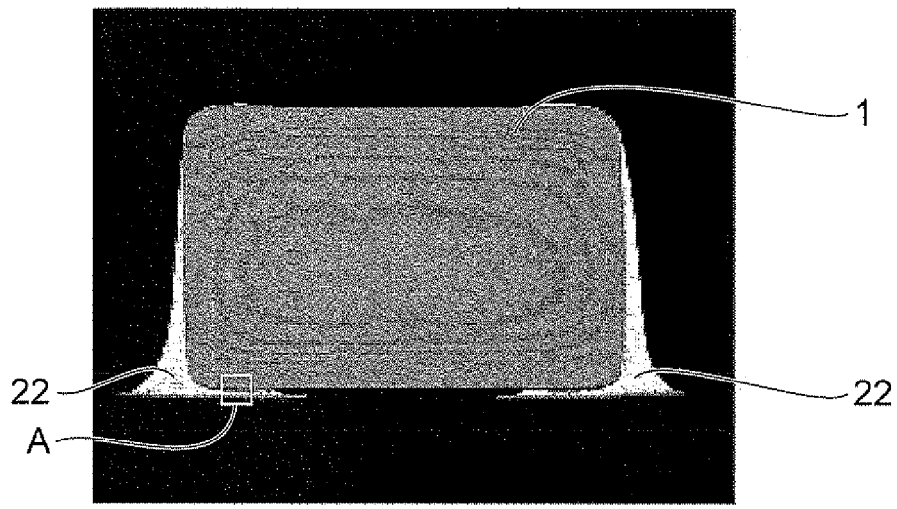
(a)
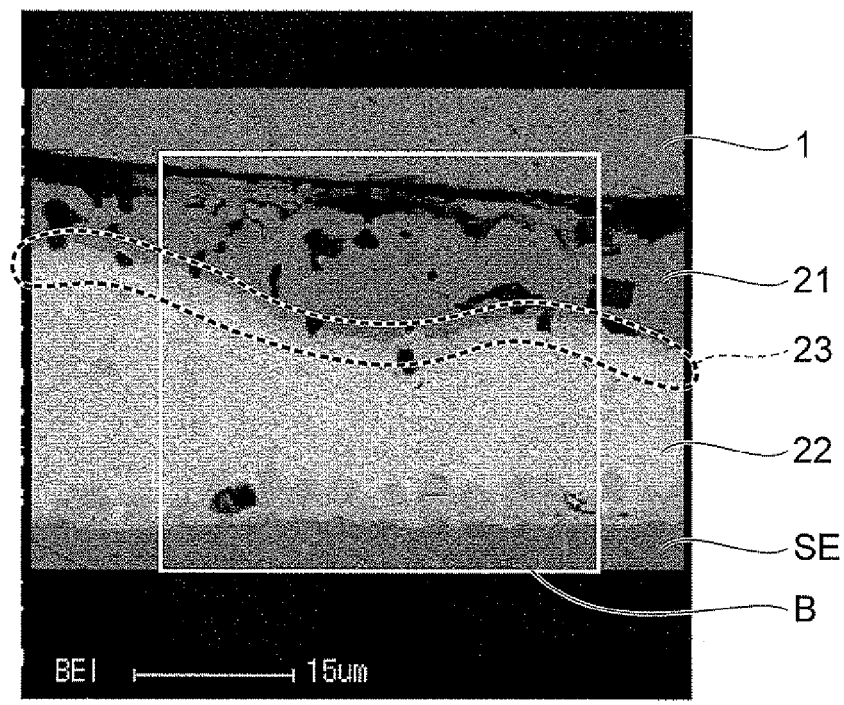
(b)

*Fig.9*
(a)
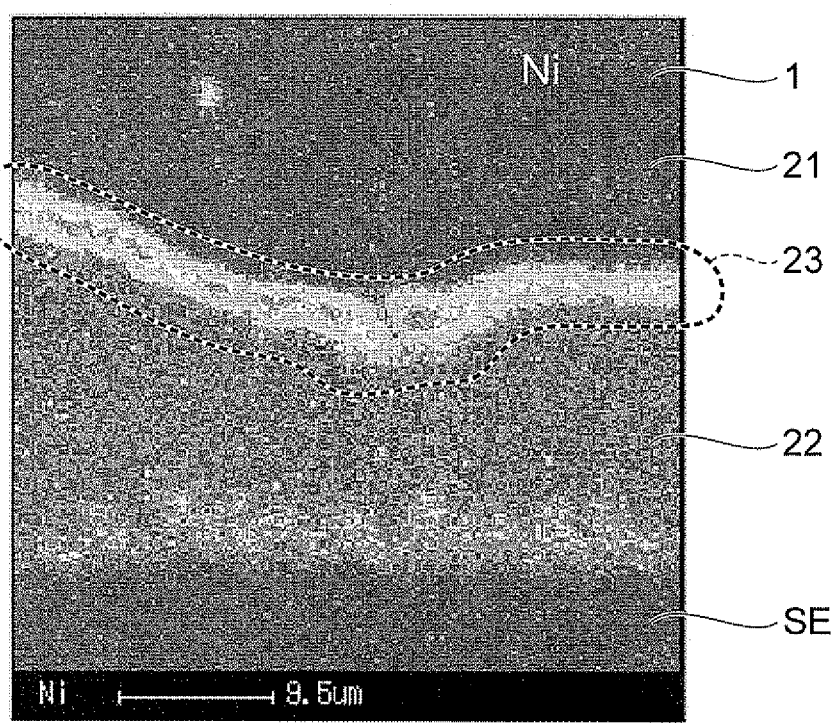
(b)
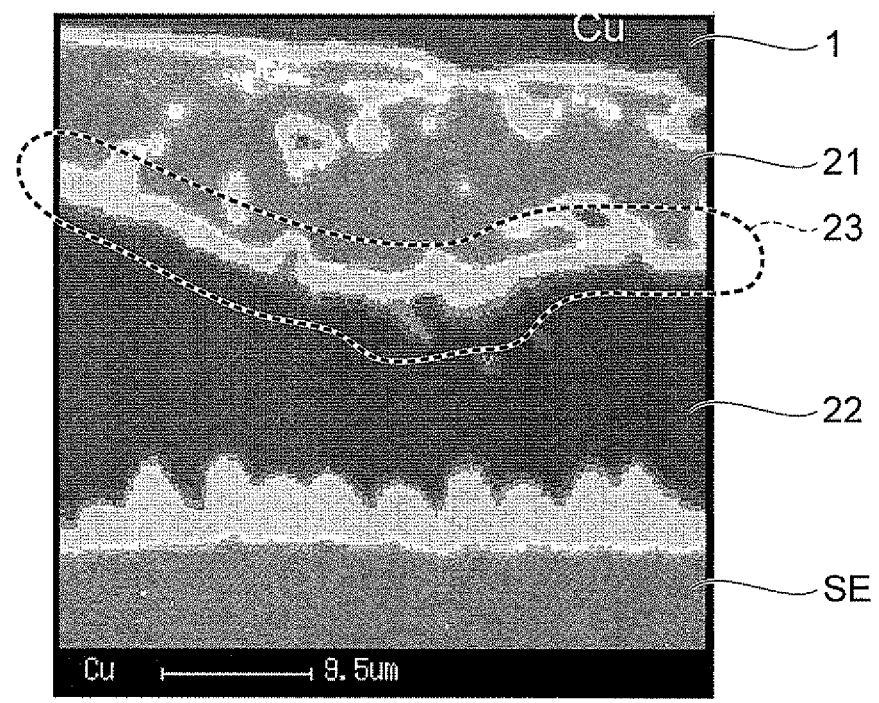

Fig.10
(a)
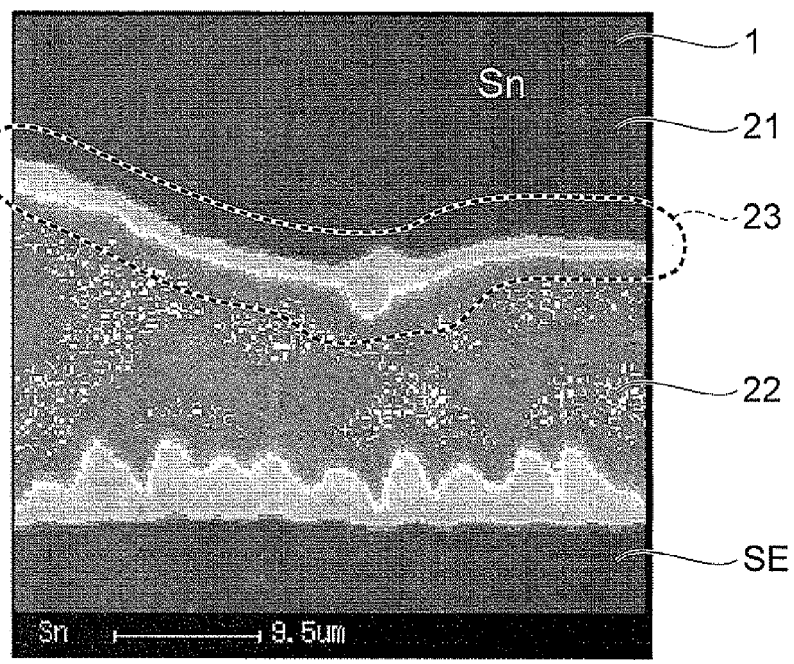
(b)
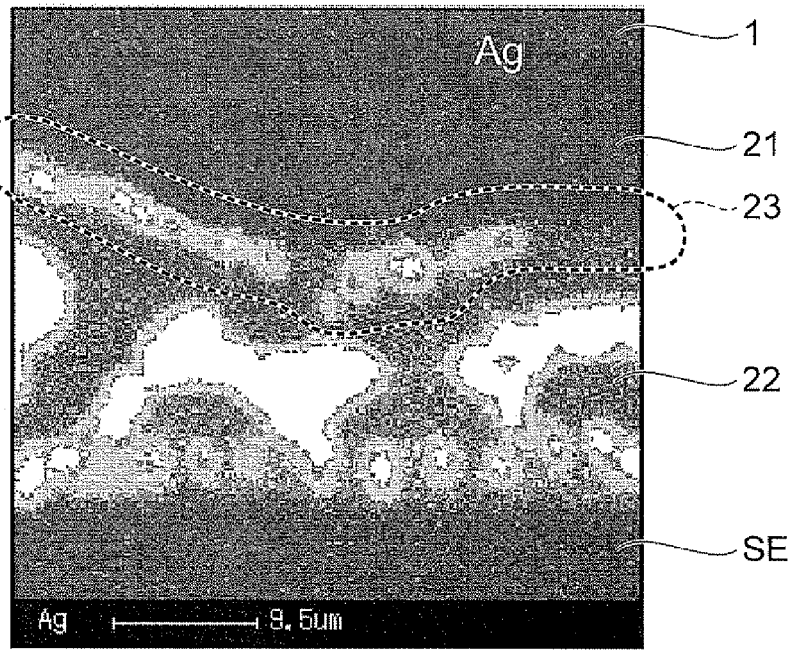

CERAMIC ELECTRONIC COMPONENT AND METHOD FOR PRODUCING SAME

BACKGROUND OF THE INVENTION

1. Field of the Invention

The present invention relates to a ceramic electronic component as well as to a method for producing the ceramic electronic component.

2. Related Background Art

In the prior art, there is known a ceramic electronic component provided with terminal electrodes each comprising a lower layer side electrode formed of a chip element with an alloy containing Ti and others vapor deposited thereon, an intermediate layer electrode formed on the lower layer side electrode by the vapor deposition of an alloy containing Cu and an upper layer side electrode formed on the intermediate layer electrode by the application of a solder coating. See, for example, Japanese Patent Publication (A) No. H05-175011.

SUMMARY OF THE INVENTION

When the Cu ground electrode layer is directly coated with a lead-free solder having a high content of Sn, a problem of the occurrence of solder leach of Cu results. Therefore, in the ceramic electronic components of the prior art where ground electrode layer of Cu thin films formed by vapor deposition are directly solder-coated, a problem of disappearance of the ground electrode layer occurs by virtue of solder leach. When the ground electrode layer is to be thickened, a problem of being too time-consuming then occurs. Moreover, fragile metal compounds such as $Cu_6Sn_5$ and $Cu_3Sn$ form at the interface of the Cu ground electrode layer and solder. This will also lead to a problem of bonding strength having been decreased. Although Ni and Sn are generally plated on a Cu ground electrode layer, solder liquid may infiltrate into a chip element, which is likely to cause a failure in dielectric voltage isolation. Therefore, there has been a need from the past that the Cu ground electrode layer can be directly coated with lead-free solder without disappearance of the Cu ground electrode layer, and without a decrease in bonding strength and the necessity of plating to be conducted.

The objective of the present invention is to provide a ceramic electronic component and a method for producing the ceramic electronic component, where the ground electrode layer can be directly coated with lead-free solder without lowering reliabilities.

The ceramic electronic component of the invention comprises: a chip element of a nearly rectangular parallelepiped shape having internal electrodes embedded therein; and terminal electrodes each covering an end face of the chip element in which the internal electrodes are exposed and being electrically connected to the internal electrode, wherein the terminal electrodes each covers the end face of the chip element and comprises:

a ground electrode layer covering the end face of the chip element and containing Cu and having been formed by firing;

a solder layer covering the entirety of the ground electrode layer and being formed of a lead-free solder based on five elements of Sn—Ag—Cu—Ni—Ge; and a diffusion layer having been formed by the diffusion of Ni between the ground electrode layer and the solder layer.

In the ceramic electronic component, the terminal electrode comprises:

a ground electrode layer covering the end face of the chip element and containing Cu and having been formed by firing;

a solder layer covering the entirety of the ground electrode layer and being formed of a lead-free solder based on five elements of Sn—Ag—Cu—Ni—Ge; and a diffusion layer having been formed by the diffusion of Ni between the ground electrode layer and the solder layer. Thus, the diffusion layer of Ni is formed between the ground electrode layer and the solder layer, and therefore, the diffusion layer, which functions as a barrier layer, can suppress the solder leach of Cu from the ground electrode layer. The diffusion layer of Ni can also suppress the growth of the fragile intermetallic compounds of Sn—Cu between the ground electrode layer and the solder layer. Therefore, a decrease in the bonding strength between the ground electrode layer and the solder layer can be prevented. Consequently, the ground electrode layer can be directly coated with lead-free solder without lowering the reliabilities of ceramic electronic components. Further, the ground electrode layer of Cu is formed by firing. Therefore, as compared to the thin film formation represented by vapor deposition, the ground electrode layer of Cu can be formed thickly in a relatively short period of time. The ground electrode layer of Cu can firmly remain even after having been in contact with lead-free solder: the chip element can maintain its state of being coated with the ground electrode layer of Cu.

Preferably, the terminal electrode covers the end face of the chip element while covering a portion of a side face of the chip element that is orthogonal to the end face. The ground electrode layer comprises: a first electrode layer having been formed by applying a Cu paste to the chip element and having a top part to cover the end face of the chip element and a side part to cover a portion of the side face of the chip element; and a second electrode layer having been formed by adhering a Cu sheet to the first electrode layer and covering the top part of the first electrode layer while covering the side part of the first electrode layer so as to expose a portion thereof. The first electrode layer has a higher glass content than does the second electrode layer. Contact of the second electrode layer having a lower glass content with the solder layer forms a diffusion layer with a large thickness at the site that corresponds to the portion of the end face where the internal electrodes of the chip element are exposed. Therefore, the solder leach from the ground electrode layer is securely suppressed, and then the connectivity between the ground electrode layer and the internal electrodes is securely protected, while the internal electrode structure is reliably protected. On the other hand, the first electrode layer having a higher glass content is partly exposed from the second electrode layer at the site that corresponds to the side face of the chip element, which functions as a mounting surface against a substrate circuit, and thus, the first electrode layer comes in direct contact with the solder layer. A large amount of glass contained in the first electrode layer is present at the corresponding site. Therefore, the area of Cu exposure is decreased at the interface with the solder layer, and the growth of the fragile intermetallic compounds of Sn—Cu (such as $Cu_6Sn_5$ and $Cu_3Sn$) is increasing suppressed. Therefore, the decrease in the bonding strength at the mounting surface is accordingly prevented. Consequently, secure protection against the solder leach will be provided at the end face side of the chip element, whereas the decrease in bonding strength is prevented with certainty at the side face side that functions as a mounting surface.

Preferably, the second electrode layer contains no glass. Because no glass is contained in the second electrode layer, the diffusion of Ni is concentrated on the surface of the second electrode layer. This will more suppress the solder leach at the end face of the chip element.

The method for producing a ceramic electronic component according to the present invention is a method for producing a ceramic electronic component which comprises a chip element of a rectangular paralleopiped shape having internal electrodes embedded therein, and terminal electrodes each covering an end face of the chip element in which the internal electrodes are exposed and being electrically connected to the internal electrodes, said method comprising:

a step of preparing the chip element;

a step of forming a ground electrode layer by covering the end face of the chip element with a conductive paste comprised of Cu followed by firing, to form the ground layer in the terminal electrode;

a step of forming a solder layer by covering the entirety of the ground electrode layer with a molten lead-free solder based on five elements of Sn—Ag—Cu—Ni—Ge to form the solder layer in the terminal electrode; and a step of forming a diffusion layer by allowing Ni to diffuse between the ground electrode layer and the solder layer to form the diffusion layer in the terminal electrode.

The method for producing a ceramic electronic component comprises: the step of forming a ground electrode layer by covering the end face of the chip element with a conductive paste comprised of Cu followed by firing, to form the ground electrode layer; the step of forming a solder layer by covering the entirety of the ground electrode layer with a molten lead-free solder based on five elements of Sn—Ag—Cu—Ni—Ge to form the solder layer; and the step of forming a diffusion layer by allowing Ni to diffuse between the ground electrode layer and the solder layer to form the diffusion layer. Thus, the diffusion layer of Ni is formed between the ground electrode layer and the solder layer, and therefore, the diffusion layer, which functions as a barrier layer, can suppress the solder leach of Cu from the ground electrode layer. The diffusion layer of Ni can also suppress the growth of the fragile intermetallic compounds of Sn—Cu. Therefore, the decrease in the bonding strength between the ground electrode layer and the solder layer can be prevented. Consequently, the ground electrode layer can be directly coated with lead-free solder without lowering the reliabilities of the ceramic electronic component.

Preferably, the terminal electrode covers the end face of the chip element while covering a portion of a side face of the chip element that is orthogonal to the end face. The step of forming a ground electrode layer comprises: a step of forming a first electrode paste layer by applying a Cu paste to the chip element to form the first electrode layer so that the first electrode layer has a top part covering the end face of the chip element and a side part covering a portion of the side face of the chip element; a step of forming a second electrode paste layer by adhering a Cu sheet to the first electrode paste layer and covering the top part of the first electrode paste layer while covering the side part of the first electrode paste layer so as to expose a portion thereof, to form the second electrode paste layer having a lower glass content than does the first electrode paste layer; and a step of firing the first electrode paste layer and the second electrode paste layer to form the first electrode layer and the second electrode layer. Contact of the second electrode layer having a lower glass content with the solder layer forms a diffusion layer with a large thickness at the site that corresponds to the portion of the end face where the internal electrodes of the chip element are exposed. Therefore, the solder leach from the ground electrode layer is securely suppressed, and then the connectivity between the ground electrode layer and the internal electrodes is securely protected, while the internal electrode structure is reliably protected. On the other hand, the first electrode layer having a higher glass content is partly exposed from the second electrode layer at the site that corresponds to the side face of the chip element, which functions as a mounting surface against a substrate circuit, and thus the first electrode layer comes in direct contact with the solder layer. A large amount of glass contained in the first electrode layer is present at the corresponding site. Therefore, the area of Cu exposure is decreased at the interface with the solder layer and the growth of the fragile intermetallic compounds of Sn—Cu (such as $Cu_6Sn_5$ and $Cu_3Sn$) is increasing suppressed. Then, the decrease in the bonding strength at the mounting surface is accordingly prevented. Consequently, secure protection against the solder leach is provided at the end face side of the chip element, whereas the decrease in bonding strength is prevented with certainty at the side face side that functions as a mounting surface.

Preferably, a molten lead-free solder based on the five elements is bonded to the ground electrode layer. This allows both the formation of the solder layer at the step of forming a solder layer and the formation of the diffusion layer at the step of forming a diffusion layer to be carried out simultaneously. Specifically, the ground electrode layer is immersed in the molten lead-free solder based on the five elements to achieve its bonding, thereby allowing the formation of the diffusion layer by the heat of solder as well as the formation of the solder layer upon cooling of the solder.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 6 is a process diagram showing the details of a step of forming a solder layer and a step of forming a diffusion layer.

FIG. 7 is a process diagram showing the details of a step of forming a solder layer and a step of forming a diffusion layer.

FIG. 8 shows photographs of the interfaces of the ceramic electronic component produced by the steps shown in FIG. 3 with a substrate circuit in the vicinity of its mounting surface.

FIG. 9 shows photographs of the data from the elemental analysis of the interfaces in the enlarged versions of the interfaces shown in FIG. 8.

FIG. 10 shows photographs of the data from the elemental analysis of the interfaces in the enlarged versions of the interface shown in FIG. 8.

DESCRIPTION OF THE PREFERRED EMBODIMENTS

Figure 1:
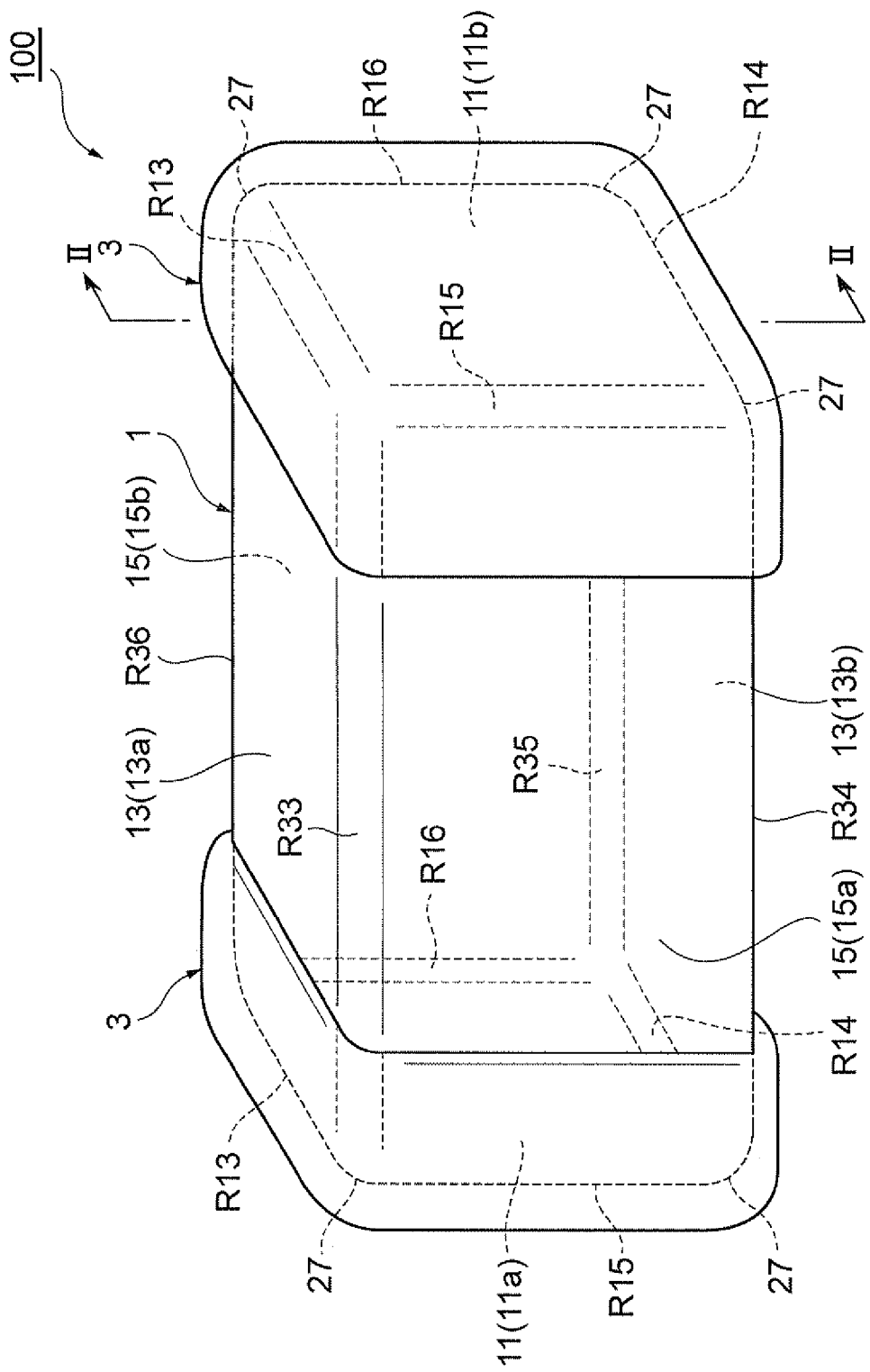
FIG. 1 is a perspective view showing an embodiment of a ceramic electronic component.

Preferred embodiments of the present invention will be described below while occasionally referring to the drawings. In the explanation of the drawings, identical or equivalent elements will be referred to by the same numerals and the explanations that may overlap will be omitted.

FIG. 1 is a perspective view showing a preferred embodiment of the ceramic electronic component. A ceramic electronic component 100 according to the present embodiment is a chip-shaped ceramic capacitor of the laminated type. The ceramic electronic component 100 is of a nearly rectangular parallelopiped shape, and, for example, its length is about 2.0 mm in the longitudinal direction (lengthwise); and it is about 1.2 mm in the width direction and in the depth direction, respectively.

The ceramic electronic component 100 comprises a chip element 1 of a nearly rectangular parallelopiped shape and a pair of terminal electrodes 3 formed at both ends of the chip element 1. The chip element 1 has end faces 11a, 11b (which will be abbreviated as "end face 11") that oppose each other, side faces 13a, 13b (which will be abbreviated as "side face 13") that are perpendicular to the end face 11 and oppose each other, and side faces 15a, 15b (which will be abbreviated as "side face 15") that are perpendicular to the end face 11 and oppose each other. The side face 13 and the side face 15 are perpendicular to each other.

The chip element 1 has a ridge part R13 between the end face 11 and the side face 13a, a ridge part R14 between the end face 11 and the side face 13b, a ridge part R15 between the end face 11 and the side face 15a, a ridge part R16 between the end face 11 and the side face 15b, a ridge part R33 between the side face 13a and the side face 15a, a ridge part R34 between the side face 15a and the side face 13b, a ridge part R35 between the side face 13b and the side face 15b, and a ridge part R36 between the side face 15b and the side face 13a. The ridge parts R13 to R16 and R33 to R36 are the portions of the chip element 1 that have been ground to form R configurations. Because of having these R configurations, the chip element 1 precludes fractures from occurring at the ridge parts R13 to r16 and R33 to R36. The curvature radius of a ridge part of the chip element 1 may be, for example, set at 3 to 15% of the width-direction length of the ceramic electronic component 100.

The terminal electrode 3 is provided to cover not only the end face 11, the ridge parts R13, R14, R15 and R16, but also to cover portions of the side faces 13, 15 at the side of the side face 11 integrally. Thus, the terminal electrode 3 is provided to cover a corner part 27 of the chip element 1. The portions of the terminal electrode 3 corresponding to the side faces 13, 15 function as mounting surfaces against substrate circuits.

Figure 2:
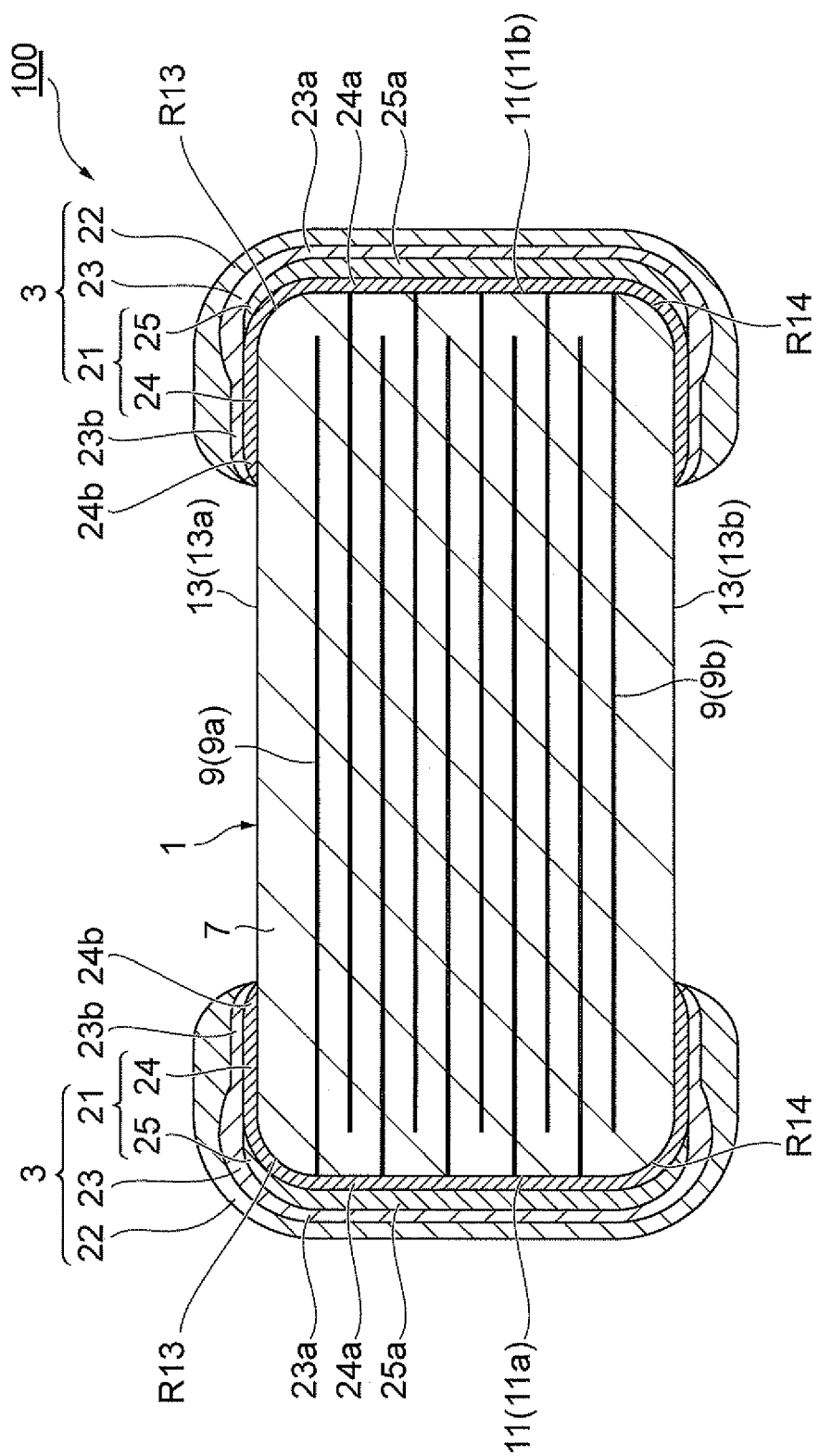
FIG. 2 is a cross sectional view schematically showing the ceramic electronic component of FIG. 1 as taken along the line II-II.

FIG. 2 is a cross sectional view schematically showing the ceramic electronic component of FIG. 1 as taken along the line II-II. Specifically, FIG. 2 is a view showing the cross section structure of the ceramic electronic component 100 when it has been cut at a face that is perpendicular to the side face 13 and that is parallel to the side face 15.

The terminal electrode 3 has such a laminated structure that a ground electrode layer 21, a solder layer 22 and a diffusion layer 23 are laminated on the end face 11, the ridge parts R13 to R16 and the corner part 27. The ground electrode layer 21 is formed of Cu as the principal component by firing. The solder layer 22 covers the entirety of the ground electrode layer 21 and is formed of a lead-free solder based on five elements of Sn—Ag—Cu—Ni—Ge. The diffusion layer 23 is formed by the diffusion of Ni between the ground electrode layer 21 and the solder layer 22. The ground electrode layer 21 comprises a first electrode layer 24 and a second electrode layer 25 covering the first electrode layer 24. The first electrode layer 24 has a higher content of glass than does the second electrode layer 25.

The first electrode layer 24 comprises a metal component containing Cu and a glass component. The first electrode layer 24 is formed by using a conductive paste containing a metal component, a glass component, and at least one member from binders, dispersants, and solvents. The first electrode layer 24 contains approximately 2 to 15% of glass component relative to Cu particles. The first electrode layer 24 is formed by applying a Cu paste to the chip element 1. The first electrode layer 24 has a top part 24a covering the end face 11 of the chip element 1, a side part 24b covering portions of the side faces 13, 15 at the side of the side face 11. The thickness of the top part 24a of the first electrode layer 24 may be set to 2 to 25 µm. The thickness of the side part 24b of the first electrode layer 24 may be set to 5 to 35 µm. The portion of the side part 24b of the first electrode layer 24 that protrudes is namely a length of the first electrode layer 24 that protrudes from the end face 11 of the chip element 1 toward the side faces 13, 15, which may be set to a length corresponding to 15 to 35% of the total chip length.

The second electrode layer 25 comprises a metal component containing Cu. The second electrode layer 25 is formed by using a conductive paste containing a metal component, a glass component, and at least one member from binders, dispersants and solvents. The second electrode layer 25 does not need to contain any glass component. Alternatively, the second electrode layer 25 may contain a glass component in an amount of 1 wt % or less relative to Cu particles.

Figure 5:
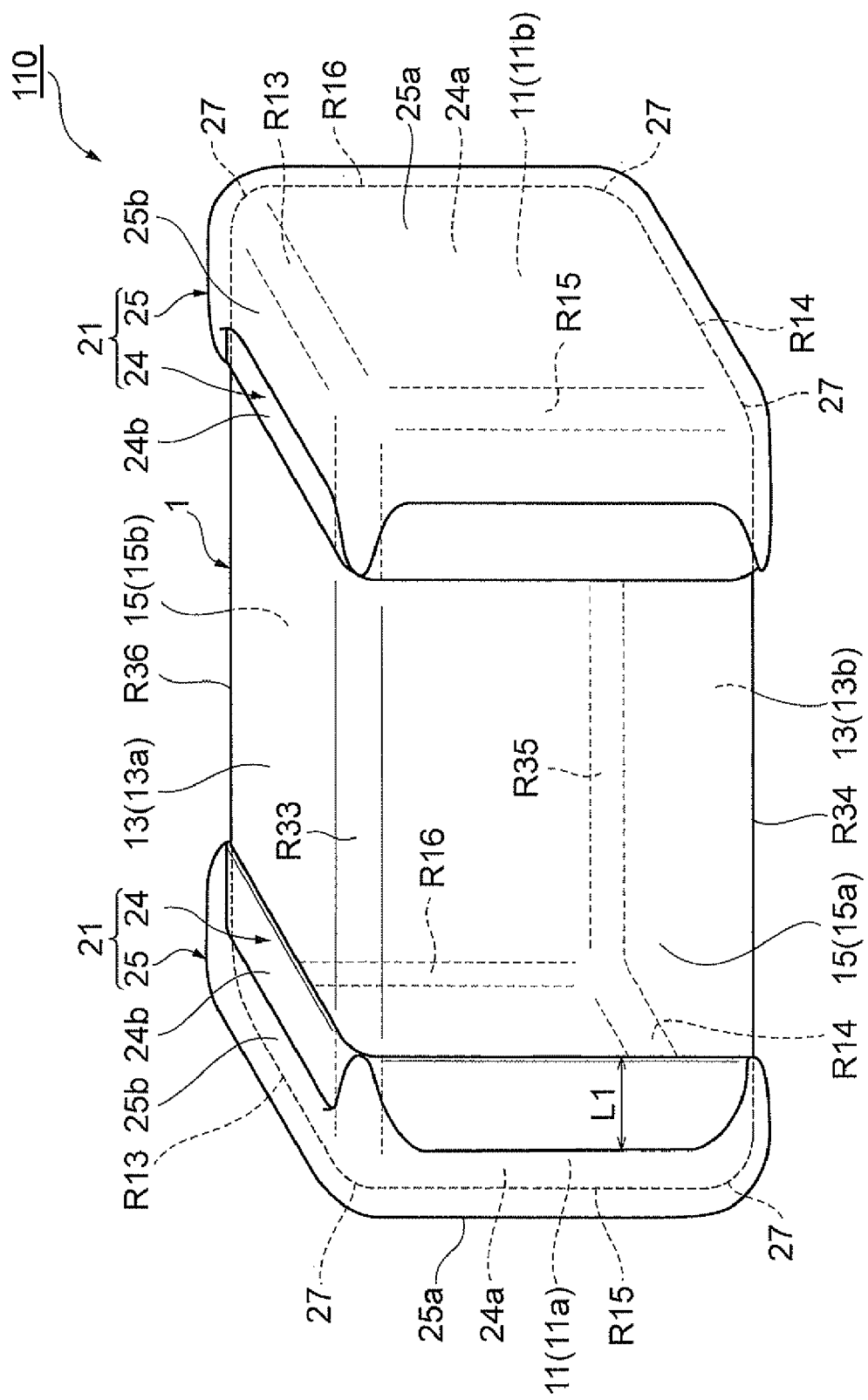
FIG. 5 is a perspective view of a chip member comprising a chip element with ground electrode layers formed at both ends thereof.

The second electrode layer 25 is formed by adhering a Cu sheet to the first electrode layer. The second electrode layer 25 has a top part 25a covering the top part 24a of the first electrode layer 24 as well as a side part 25b covering the side part 24b of the first electrode layer 24 so as to expose a portion thereof. Specifically, the top part 25a of the second electrode layer 25 covers the top part 24a of the first electrode layer 24 over its entire area, as is shown in FIG. 5. By contrast, the side part 25b of the second electrode layer 25 covers the side part 24b of the first electrode layer 24 in the vicinities of the ridge parts R13 to R16 as well as covers the vicinities of the ridge parts R33 to R36 at the side of the top part 24a. The side part 25b of the second electrode layer 25 allows the side part 24b of the first electrode layer 24 to be exposed in the regions of the neighborhood of the end part that is opposite to the top part 24a. The width of the exposed portion of the side part 24b of the first electrode layer 24 (i.e., the width represented by L1 in FIG. 5) may be set to a length corresponding to 10 to 30% of the total chip length. The side part 24b of the first electrode layer 24 at said portion comes in direct contact with solder during soldering. The thickness of the top part 25a of the second electrode layer 25 may be set to 5 to 20 µm; and the thickness of the side part 25b of the second electrode layer 25 may be set to 2 to 20 µm.

Referring back to FIG. 2, the solder layer 22 is formed by coating the entirety of the ground electrode layer 21 with a lead-free solder based on five elements of Sn—Ag—Cu—Ni—Ge. The lead-free solder based on the five elements contains Sn as the principal component, 1.0 to 4.0 wt % Ag, 0.1 to 2.0 wt % Cu, 0.01 to 1.0 wt % Ni, and 0.005 to 0.1 wt % Ge. The thickness of the solder layer 22 at its top part side may be set to 3 to 50 µm and the thickness at its side part side may be set to 3 to 50 µm.

The diffusion layer 23 is formed by the diffusion of Ni from the lead-free solder of the solder layer 22 toward the side of the ground electrode layer 21. The solder layer 23 has a first part 23a formed at the interface of the solder layer 22 and the second electrode layer 25 of the ground electrode layer 21, and a second part 23b formed at the interface of the solder layer 22 and the first electrode layer 24 of the ground electrode layer 21. The second part 23b of the diffusion layer 23 is formed at the exposed portion, which is not covered by the second electrode layer 25, in the side part 24b of the first electrode layer 24. The first part 23a of the diffusion layer 23 has a thickness larger than that of the second part 23b because it is in contact with the second electrode layer 25 having a lower glass content than does the first electrode layer 24. By contrast, the second part 23b of the diffusion layer 23 has a thickness smaller than that of the first part 23a because it is in contact with the first electrode layer 24 having a higher glass content than does the second electrode layer 25.

Concretely, the first part 23a of the diffusion layer 23 is preferably set to 1 to 4 µm. This is because if the thickness of the diffusion layer 23 is less than 1 µm, the protection of the ground electrode layer 21 of Cu against solder leach will possibly be insufficient. This is also because if the thickness of the diffusion layer 23 is greater than 4 µm in contrast, there will be the possibility that the diffusion layer 23 becomes fragile at any point of its formation and sufficient bonding strength cannot be obtained.

The second part 23b of the diffusion layer 23 is preferably set to less than 1 µm. While the portion corresponding to either of the side faces 13, 15 in the terminal electrode 3 acts as a mounting surface for a substrate circuit, said portion experience higher stress concentration as compared to the portion corresponding to the end face 11 in the terminal electrode 3. Therefore, even if the thickness of the second part 23b corresponding to the side face 13 or 15 is 4 µm or less, its fragility will possibly be a problem. However, once the thickness of the second part 23b has been set to less than 1 µm, the bonding strength can be assured more reliably. Because the glass content in the first electrode layer 24 is high, it suppress the generation of the intermetallic compounds ($Cu_3Sn$, $Cu_6Sn_5$) between Sn in the solder layer 22 and Cu in the first electrode layer 24. Therefore, the bonding strength is assured even more.

The chip element 1 is constructed with a plurality of dielectric layers 7 and a plurality of internal electrodes 9 being laminated alternately. The direction of lamination is perpendicular to the facing directions of a pair of the end faces 11, which provide the terminal electrode 3, and it is parallel to the facing directions of a pair of the side faces 13. For the sake of the convenience in explanation, the numbers of laminated dielectric layers 7 and internal electrodes 7 are set to a level of numbers which can be visually recognized with ease in FIG. 2. Nevertheless, the numbers of the laminated dielectric layers 7 and internal electrodes 7 may appropriately be altered depending on the desired electronic properties. The number of laminations may, for example, be set to several tens of layers, respectively for the dielectric layers 7 and the internal electrodes 9 and may even be set to a level of 100 to 500 layers. The dielectric layers 7 may be integrated to the extent that the boundaries between the respective layers cannot be visually recognized.

The internal electrode 9a is, on one hand, electrically connected to the terminal electrode 3 at the side of the end face 11a, and on the other hand, it is electrically insulated against the terminal electrode 3 at the side of the end face 11b. The internal electrode 9b is, on one hand, electrically connected to the terminal electrode 3 at the side of the end face 11b, and on the other hand, it is electrically insulated against the terminal electrode 3 at the side of the end face 11a. The internal electrodes 9a and 9b are alternately laminated with the dielectric layer 7 being sandwiched therebetween. The ceramic electronic component 100 according to the present embodiment has an excellent insulating reliability between the terminal electrode 3 at the side of the end face 11a and the internal electrode 9b as well as between the terminal electrode 3 at the side of the end face 11b and the internal electrode 9a.

Figure 3:
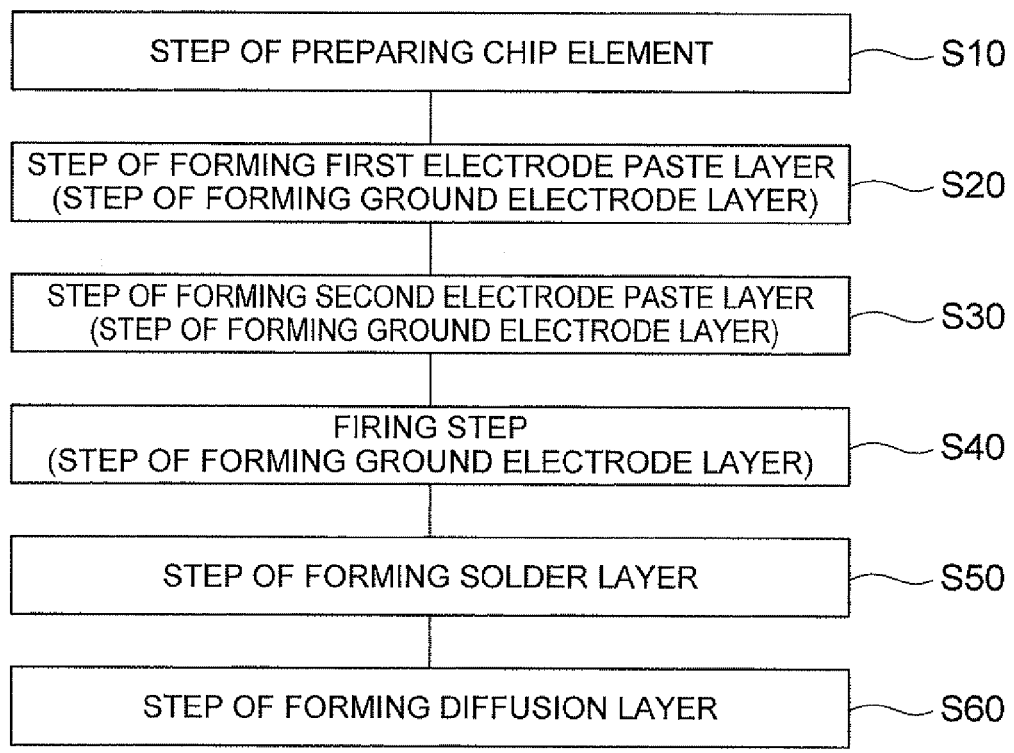
FIG. 3 is a flow diagram showing a method for producing a ceramic electronic component according to the present embodiment.

Referring then to FIGS. 3 to 7, one example of the method for producing the ceramic electronic component 100 shown in FIGS. 1 and 2 will be described. FIG. 3 is a flow diagram showing a method for producing the ceramic electronic component 100 according to the present embodiment.

As FIG. 3 shows, the method for producing the ceramic electronic component 100 starts with treatment from a step of preparing a chip element (S10) to prepare the chip element 1. In the step of preparing a chip element (S10), a ceramic green sheet, which will become into the dielectric layer 7, is first formed in order to prepare the chip element 1. After a ceramic slurry may be applied on a PET film using the doctor blade method or the like, it may be dried to form the ceramic green sheet. The ceramic slurry may be, for example, produced by adding solvents, plasticizers and others to a dielectric material comprised of barium titanate as the principal component and mixing them. Electrode patterns, which will become internal electrodes 9, are screen-printed on the thus-formed ceramic green sheet and are dried. An electrode paste, which is obtained by mixing binders, solvents or the like with Cu powders, may be used to screen-print the electrode patterns. Green sheets with a plurality of electrode patterns are thus formed and are laminated. Subsequently, a laminate of the green sheets with electrode patterns is cut perpendicularly to the direction of lamination to form a laminated chip of a rectangular parallelepiped shape, and it is subjected to heat treatment, effecting removal of binders. The heat treatment is preferably carried out at 180 to 400° C. for 0.5 to 30 hours. The laminated chip resulting from the heat treatment is fired at 800 to 1,400° C. for 0.5 to 8.0 hours, and it is barrel ground to chamfer edges, whereby the ridge parts of the rectangular parallelepiped shape are made into R configurations. This allows the chip element 1 to be prepared.

Once the step of preparing a chip element (S10) has been completed, a step of forming a first electrode paste layer 33 (S20) (a step of forming a ground electrode layer) is carried out to form the first electrode paste layer 33, which will become the first electrode 24. A conductor paste is bonded to the chip element 1 at the step of forming a first electrode paste layer (S20). As the conductor paste, there can be used a component contained in a Cu paste for conductor green sheet to which glass fits are added. By placing one end face 11a of the chip element 1 downward, the end face 11a, the ridge parts R13 to R16, and portions of the side faces 13, 15 at the side of the end face 11a are immersed in the conductor paste. This allows the conductor paste to be bonded to the end face 11a, the ridge parts R13 to R16, and the portions of the side faces 13, 15 at the side of the end face 11a.

Figure 4:
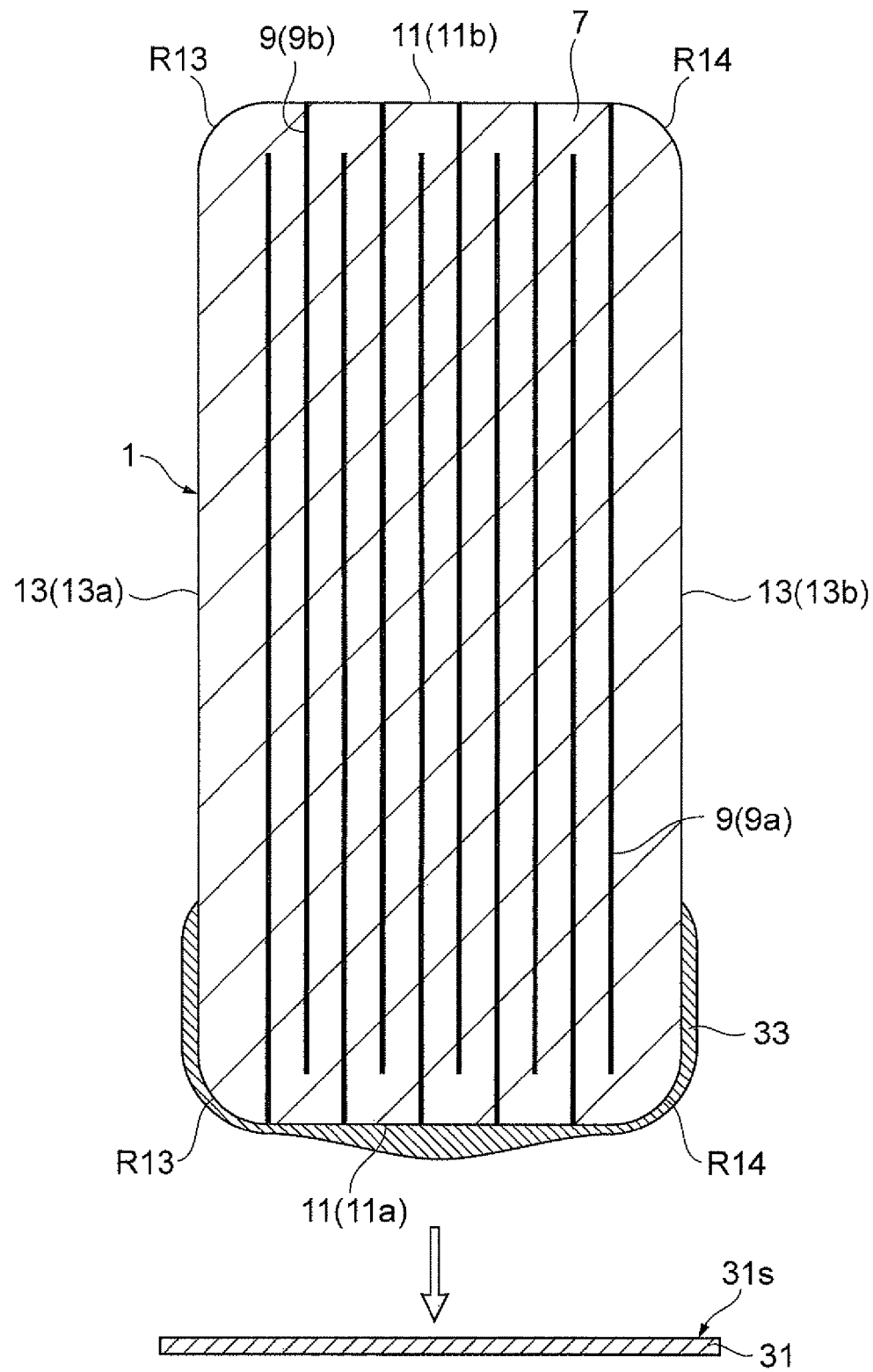
FIG. 4 shows a state in which a first electrode paste layer is formed on a chip element.

FIG. 4 shows a state in which the first electrode paste layer 33 has been formed on the chip element 1. FIG. 4 is a cross sectional view of the process schematically showing the details of the step of forming a first electrode paste layer and the step of forming a second electrode paste layer. As FIG. 4 shows, the conductor paste 33 has been bonded to the end face 11a, the ridge parts R13 to R16, and the portions of the side faces 13, 15 at the side of the end face 11a in the chip element 11 by carrying out the step of forming a first electrode paste layer (S20).

The step of forming a second electrode paste layer (S30) (a step of forming a ground electrode layer) is next carried out to form the second electrode paste layer 31, which will become the second electrode layer 25. In the step of forming a second electrode paste layer (S30), a conductor green sheet, which will constitute the second electrode paste layer 31, is first formed. Specifically, a paste for the conductor green sheet is applied on a film of PET (polyethylene terephthalate) at a thickness of about 70 μm. As the paste for the conductor green sheet, there can be used a mixture of powders of metals containing Cu or alloys, resin binders and organic solvents.

The paste applied on a PET film is then dried to form a conductor green sheet. Organic components remain in the dried conductor green sheet. The thickness of the conductor green sheet may be set to a range of 10 to 50 μm.

The conductor green sheet is cut on the PET film to the desired sizes, forming a conductor green sheet that constitutes the second electrode paste layer 31 (FIG. 4). In this case, the conductor green sheet that constitutes the second electrode paste layer 31 is cut into such a size that the adherent surface with which it will stick to the chip element 1 may be slightly larger than the size of the end face 11 of the chip element 1. Specifically, when the end face 11 and the adherent surface of the conductor green sheet that constitutes the second electrode paste layer 31 are both square in shape, it is preferred that the size of the conductor green sheet be 100 to 150% based on the area of the end face 11. After cutting, the conductor green sheet that constitutes the second electrode paste layer 31 can be obtained by peeling off the PET film.

As FIG. 4 shows, one face 31s of the conductor green sheet, which is the second electrode paste layer 31, is adhered onto the end face 11a of the chip element 1 at the conductor sheet adhering step. Specifically, the chip element 1 is pressed against the conductor green sheet of the second electrode paste layer 31 so that the end face 11a to which the first electrode paste layer 33 of the chip element 1 has been bonded, on one side, is directed to the one face 31s of the conductor green sheet of the second electrode paste layer 31.

When the conductor green sheet of the second electrode paste layer 31 has been adhered onto the end face 11a of the chip element 1, the first electrode paste layer 33 bonded to the end face 11a of the chip element 1 is extruded in the direction from the center of the end face 11a toward the edge of the end face 11a. The second electrode paste layer 31 and the chip element 1 are bonded through the first electrode paste layer 33.

Upon adhering, organic solvents contained in the first electrode paste layer 33 penetrate into the dried second electrode paste layer 31 and dissolve any organic components remaining in the second electrode paste layer 31. As a result, the second electrode paste layer 31 will acquire elasticity to deform along the ridge parts R13 to R16 and the corner part 27 in the chip element 1, resulting in the integration of the second electrode paste layer 31 and the first electrode paste layer 33. The organic components remaining in the second electrode paste layer 31 include, for example, binders contained in the paste for the conductor green sheet.

In the drying step, the first electrode paste layer 33 and the second electrode paste layer 31 bonded to the chip element 1 are dried to form a conductor layer having two layers with different contents of glass components. In this case, while the side of the end face 11a of the chip element 1 is directed downward, the first electrode paste layer 33 and the second paste layer 31 are dried.

Because the first electrode paste layer 33 has a higher portion of organic solvent content than does the second electrode paste layer 31, the shrinkage percentage of the first electrode paste layer 33 accompanied by the evaporation of organic solvents during is greater than that of the second electrode paste layer 31. Thus, as drying progresses, the second electrode paste layer 31 deforms along the ridge parts R13 to R16 and the corner part 27.

The size of the one face 31s of the second electrode paste layer 31 is slightly larger than that of the end face 11 of the chip element 1. Thus, the end part of the second electrode paste layer 31 along its periphery deforms during the drying step so as to cover portions of the side faces 13, 15 at the side of the end face 11a. This will achieve the formation of a conductor layer having two layers with different contents of glass components.

Integrity or adhesiveness of the first electrode paste layer 33 and the second electrode paste layer 31 can further be adjusted, for example, by changing the contents of binders included in the pastes.

Subsequently, the step of forming a first electrode paste layer (S20) (the step of forming a ground electrode layer) and the step of forming a second electrode paste layer formation (S30) (the step of forming a ground electrode layer) are carried out on the side of the end face 11b of the chip element 1, similarly to the side of the end face 11a. This will form the same conductor layer on the side of the end face 11b as that on the side of end face 11a.

After the first electrode paste layer 33 and the second electrode paste layer 31 have been fowled, a step of firing electrodes (S40) is carried out. In the firing step (S40), the conductor layers formed on the end face 11 and the side faces 13, 15 are fired to form the ground electrode layer 21. Firing is carried out, for example, at 400 to 850° C. for 0.2 to 5.0 hours. Firing will cause the thickness of the first electrode paste layer 33 bonded on the side faces 13, 15 of the chip element 1 to be thinner. After firing, a chip member 110 shown in FIG. 5 is obtained.

FIG. 5 is a perspective view of the chip member 110 comprising the chip element 1 with the ground electrode layers 21 formed at both end parts thereof. The ground electrode layer 21 has a laminated structure such that the first electrode layer 24 and the second electrode layer 25 are laminated on portions of the side faces 13, 15 at the side of the end face 11 as well as on the end face 11 sequentially from the side of the chip element 1. Because the first electrode layer 24 has a higher content of glass component than does the second electrode layer 25, the chip element 1 and the first electrode layer 24 are adhered Thinly through the first electrode layer 24. In contrast, the second electrode layer 25 is denser than the first electrode layer 24 since it has less glass component.

A step of forming a solder layer (S50) is next carried out by covering the entirety of the ground electrode layer 21 with a molten lead-free solder based on five elements of Sn—Ag—Cu—Ni—Ge to form the solder layer 22 in the terminal electrode 3. In the step of forming a solder layer (S50), while the molten solder is cooled to solidify and the formation of the solder layer 22 is thus conducted, the heat of the solder layer 22 causes Ni to diffuse between the ground electrode layer 21 and the solder layer 22, and thus a step of forming a diffusion layer (S60) is carried out simultaneously to form the diffusion layer 23 in the terminal electrode 3.

Further, the contents of the step of forming a solder layer (S50) and the step of forming a diffusion layer (S60) will be described in detail by referring to FIGS. 6 and 7. FIGS. 6 and 7 are each a process diagram showing the step of forming a solder layer (S50) and the step of forming a diffusion layer (S60). As FIG. 6(a) shows, the immersion in a molten lead-free solder based on the five elements is conducted in such a manner that the solder covers the ground electrode layer 21 formed on the chip element 1. This allows the molten lead-free solder based on the five elements 34 to be in direct contact with the ground electrode layer 21, as shown in FIG. 6(b). During this time, Sn contained in the lead-free solder based on the five elements 34 diffuses toward the side of the ground electrode layer 21, and thus the intermetallic compounds of Sn—Cu are formed at the interface of the lead-free solder based on the five elements 34 and the ground electrode layer 21. Specifically, a $Cu_6Sn_5$ layer 36 and a $Cu_3Sn$ layer 37 form in this order from the lead-free solder based on the five elements 34.

As FIG. 7(a) shows, Cu atoms in the $Cu_6Sn_5$ layer 36 at the interface of the lead-free solder based on the five elements 34 and the ground electrode layer 21 are replaced by Ni atoms contained in the lead-free solder based on the five elements 34, and Ni diffuses to the side of the ground electrode layer 21 of Cu at the next step. This allows the diffusion layer 23 of Ni to gradually form at the site of the $Cu_6Sn_5$ layer 36. Finally, Cu in the $Cu_6Sn_5$ layer 36 is all replaced by Ni to form the diffusion layer 23 of Ni. This diffusion layer 23 of Ni suppresses any further growth of the intermetallic compounds of Sn—Cu, while the solder leach of the ground electrode layer 21 is suppressed. As the lead-free solder based on the five elements cools, the solder layer 22 forms.

Then, as FIG. 2 shows, a first part 23a becomes thicker than a second part 23b in the diffusion layer 23 because the glass content of the second electrode layer 25 is lower than that of the first electrode layer 24 within the ground electrode layer 21. Consequently, the steps shown in FIG. 3 are completed and the ceramic electronic component 100 can be produced.

As used in the present Specification, the term "nearly rectangular paralleopiped shape" undoubtedly means not only cubic or rectangular parallelepiped shapes, but also shapes of which ridge parts are R configurations as a result of chamfering of the ridge parts of a rectangular parallelepiped such as the chip element 1 according to the present embodiment. Specifically, the chip element according the present embodiment may only have to be provided substantially with cubic or rectangular parallelepiped shapes.

The working effects of the ceramic electric component 100 according to the present embodiment will be described next.

In the ceramic electronic component 100 according to the present embodiment, the terminal electrode 3 comprises: the ground electrode layer 21 covering the end face 11 of the chip element 1, containing Cu as the principal component and having been formed by firing; the solder layer 22 covering the entirety of the ground electrode layer 21 and being formed of a lead-free solder based on five elements of Sn—Ag—Cu—Ni—Ge; and the diffusion layer 23 having been formed by the diffusion of Ni between the ground electrode layer 21 and the solder layer 22. Thus, the diffusion layer 23 of Ni is formed between the ground electrode layer 21 and the solder layer 22; therefore, the diffusion layer 23, which functions as a barrier layer, can suppress the solder leach of Cu from the ground electrode layer 21. The diffusion layer 23 of Ni can also suppress the growth of the fragile intermetallic compounds of Sn—Cu between the ground electrode layer 21 and the solder layer 22. Therefore, the decrease in the bonding strength between the ground electrode layer 21 and the solder layer 22 can be prevented. Consequently, the ground electrode layer can be directly coated with lead-free solder without lowering the reliabilities of the ceramic electronic component 100.

In the ceramic electronic component 100 according to the present embodiment, the ground electrode layer 21 comprises: the first electrode layer 24 having the top part 24a to cover the end face 11 of the chip element 1 and the side part 24b to cover portions of the side faces 13, 15 of the chip element 1; and the second electrode layer 25 covering the top part 24a of the first electrode layer 24 while covering the side part 24b of the first electrode layer 24 so as to expose a portion thereof. Further, the first electrode layer 24 has a higher glass content than does the second electrode layer 25. Thus, contact of the second electrode layer 25 having a lower glass content with the solder layer 22 forms the diffusion layer 23 with a large thickness at the site that corresponds to the portion of the end face 11 where the internal electrodes 9 of the chip element 1 are exposed. Therefore, the solder leach against the ground electrode layer 21 is securely suppressed, and then, the connectivity between the ground electrode layer 21 and the internal electrodes 9 is securely protected, while the internal electrode structure is reliably protected. On the other hand, the first electrode layer 24 having a higher glass content is partly exposed from the second electrode layer 25 at the sites that correspond to the side faces 13, 15 of the chip element 1, which function as mounting surfaces against substrate circuits, and thus it comes in direct contact with the solder layer 22. The glass contained in the first electrode layer 24 is present at the corresponding sites. Therefore, the area of Cu exposure is decreased at the interface against the solder layer 22, and the growth of the fragile intermetallic compounds of Sn—Cu (such as $Cu_6Sn_5$ and $Cu_3Sn$) is increasing suppressed. Therefore, the decrease in the bonding strength at the mounting surface is accordingly prevented. Consequently, secure protection against the solder leach is provided at the side of the end face 11 of the chip element 1, whereas the decrease in bonding strength is prevented with certainty at the side faces 13, 15 that function as mounting surfaces.

In the ceramic electronic component 100 according to the present embodiment, the second electrode layer 25 contains no glass.

Because no glass is contained in the second electrode layer 25, the diffusion of Ni is concentrated on the surface of the second electrode layer 25. This will more suppress the solder leach at the end face 11 of the chip element 1.

In the method for producing the ceramic electronic component 100 according to the present embodiment, there are provided steps of forming a ground electrode layer (S20 to S40) by covering the end face 11 of the chip element 1 with Cu as the principal component followed by firing, to form the ground electrode layer 21, the step of forming a solder layer (S50) by covering the entirety of the ground electrode layer with a molten lead-free solder based on five elements of Sn—Ag—Cu—Ni—Ge to form the solder layer 22, and the step of forming a diffusion layer (S60) by allowing Ni to diffuse between the ground electrode layer 21 and the solder layer 22 to form the diffusion layer 23. Thus, the diffusion layer 23 is formed between the ground electrode layer 21 and the solder layer 22 by the diffusion of Ni; therefore, the diffusion layer 23, which functions as a barrier layer, can suppress the solder leach of Cu from the ground electrode layer 21. The Ni diffusion layer can also suppress the growth of the fragile intermetallic compounds of Sn—Cu between the ground electrode layer 21 and the solder electrode layer 22. Therefore, the decrease in the bonding strength between the ground electrode layer 21 and the solder layer 22 can be prevented. Consequently, the ground electrode layer 21 can be directly coated with lead-free solder without lowering the reliabilities of the ceramic electronic component 100.

Further, in the method for producing the ceramic electronic component 100, the step of forming a ground electrode layer comprises: the step of forming a first electrode paste layer (S20) by applying a Cu paste to the chip element 1 to form the first electrode layer 33 in such a manner that it has the top part 24*a* covering the end face 11 of the chip element 1 as well as the side part 24*b* covering portions of the side face 13, 15 of the chip element 1; the step of forming a second electrode paste layer (S30) by adhering a Cu sheet to the first electrode paste layer 33 to cover the top part 24*a* while covering the side part 24*b* so as to expose a portion thereof, to form the second electrode paste layer 31 having a lower glass content than does the first electrode paste layer 33; and the firing step (S40) of firing the first electrode paste layer 33 and the second electrode paste layer 31 to form the first electrode layer 24 and the second electrode layer 25. Contact of the second electrode layer 25 having a lower glass content with the solder layer 22 forms the diffusion layer 23 with a large thickness at the site that corresponds to the portion of the end face 11 where the internal electrodes 9 of the chip element 1 are exposed. Therefore, the solder leach from the ground electrode layer 21 is securely suppressed, and then the connectivity between the ground electrode layer 21 and the internal electrodes 9 is securely protected, while the internal electrode structure is reliably protected. On the other hand, the first electrode layer 24 having a higher glass content is partly exposed from the second electrode layer 25 at the sites that correspond to the side faces 13, 15 of the chip element 1, which function as mounting surfaces against substrate circuits, and thus the first electrode layer 24 comes in direct contact with the solder layer 22. A large amount of glass contained in the first electrode layer 24 is present at the corresponding sites. Therefore, the area of Cu exposure is decreased at the interface against the solder layer 22 and the growth of the fragile intermetallic compounds of Sn—Cu (such as $Cu_6Sn_5$ and $Cu_3Sn$) is increasing suppressed. Then, the decrease in the bonding strength at the mounting surface is accordingly prevented. Consequently, secure protection against the solder leach is provided at the side of the end face 11 of the chip element 1, whereas the decrease in bonding strength is prevented with certainty at the sides of side faces 13, 15 that function as mounting surfaces in the method for producing the ceramic electronic component 100 according to the present invention.

The examples of the ceramic electronic component 100 according to the present embodiment will next be described. FIG. 8 shows photographs of the interfaces of the ceramic electronic component 100 produced by the steps shown in FIG. 3 in the vicinities of the mounting surface with a substrate circuit. FIGS. 9 and 10 show photographs of the data from the elemental analysis of the interfaces in the enlarged photographs of the interfaces shown in FIG. 8. The photograph shown in FIG. 8(*a*) is a photograph of the ceramic electronic component 100 being mounted on a substrate circuit. FIG. 8(*b*) is an enlarged photograph of the interface shown as "A" in FIG. 8(*a*). FIG 9(*a*) is a photograph showing the data from the elemental analysis of the interface with respect to Ni at the part shown as "B" in FIG. 8(*b*). FIG. 9(*b*) is a photograph showing the data from the elemental analysis of the interface with respect to Cu at the part shown as "B" in FIG. 8(*b*). FIG. 10(*a*) is a photograph showing the data from the elemental analysis of the interface with respect to Sn at the part shown as "B" in FIG. 8(*b*). FIG. 10(*b*) is a photograph showing the data from the elemental analysis of the interface with respect to Ag at the part shown as "B" in FIG. 8(*b*).

As FIG. 8(*b*) shows, the ground electrode layer 21 of the chip element 1 is electrically connected to a substrate electrode SE of Cu through the solder layer 22. In FIG. 8(*b*) the diffusion layer 23 of Ni is formed at the interface of the ground electrode layer 21 and the solder layer 22 (the part encircled by dotted line in the figure). This is also evident from the inclusion of abundant Ni at the site of the diffusion layer 23 as shown in FIG. 9(*a*). Thus, it is understood that the diffusion layer 23 suppresses the solder leach of the ground electrode layer 21. In addition, a diffusion layer of Ni hardly forms at the interface of the substrate electrode SE and the solder layer 22. Based on this finding, it is understood that direct contact of a Cu layer with a solder layer alone does not form a diffusion layer of Ni to a sufficient degree and that the immersion in a molten solder (inclusive of temperature conditions and others) contributes to the formation of a diffusion layer of Ni.

As FIG. 9(*b*) and FIG. 10(*a*) show, it is found that at the interface of the substrate electrode SE and the solder layer 22, Cu in the substrate electrode SE has diffused into the solder layer 22 and a large layer of the intermetallic compounds of Sn—Cu is progressively formed. In contrast, it is found that at the interface of the ground electrode layer 21 and the solder layer 22, the growth of the intermetallic compounds of Sn—Cu is suppressed by the suppressed diffusion of Cu.

The preferred embodiment of the present invention has been described thus far; however, the invention is not to be limited to the above embodiment. For example, although the ceramic electronic component 100 has been explained as a capacitor in the above embodiment, it should not be limited thereto. The ceramic electronic component of the present invention may be any of a varistor, inductor, and LCR. The chip element 1 may also be a varistor or magnetic layer instead of being the dielectric layer 7 mentioned above.

Figure 11:
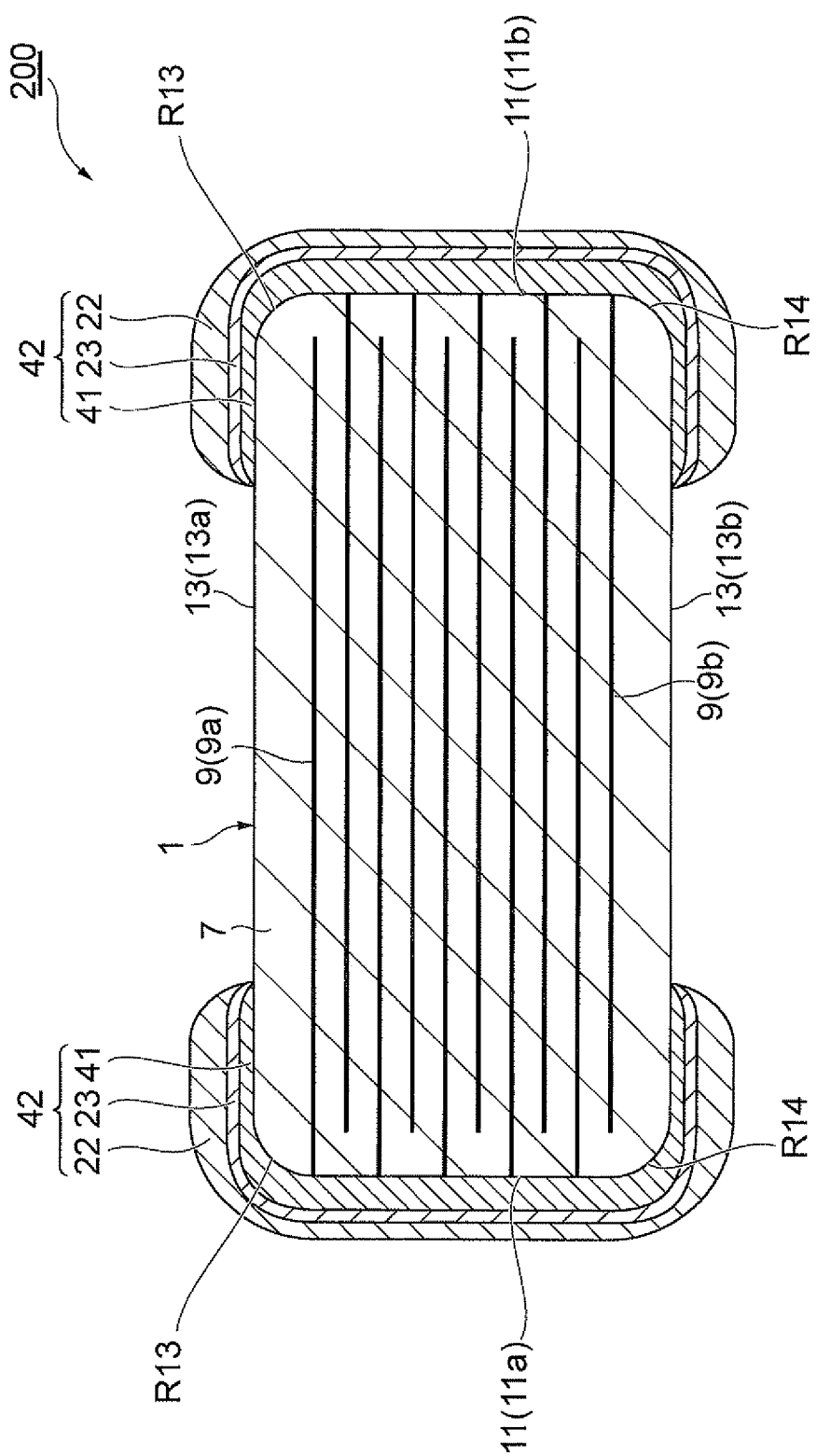
FIG. 11 is a view that corresponds to FIG. 2, showing a cross section of a ceramic electronic component according to a modified embodiment.

In the above-mentioned embodiment, the ground electrode layer is comprised of the two layers—the first electrode layer 24 and the second electrode layer 25. As FIG. 11 shows, a ceramic electronic component 200 the ground electrode of which is comprised of only one electrode layer may be an alternative. In the ceramic electronic component 200, a ground electrode layer 41 is comprised of only one electrode layer formed by immersion and firing. A diffusion layer 23 of Ni forms between a solder layer 22 and the ground electrode layer 41.

What is claimed is:

1. A ceramic electronic component comprising:
    a chip element of a rectangular parallelepiped shape having internal electrodes embedded therein; and
    terminal electrodes covering end faces of the chip element in which the internal electrodes are exposed and being electrically connected to the internal electrodes,
    wherein the terminal electrodes each comprises: a ground electrode layer covering the end face of the chip element and containing Cu and having been formed by firing;
    a solder layer covering the entirety of the ground electrode layer and being formed of a lead-free solder based on five elements of Sn—Ag—Cu—Ni—Ge; and
    a diffusion layer having been formed by the diffusion of Ni between the ground electrode layer and the solder layer.

2. The ceramic electronic component according to claim 1, wherein the terminal electrode covers the end face of the chip element while covering a portion of a side face of the chip element that is orthogonal to the end face, and
    further wherein the ground electrode layer comprises:
        a first electrode layer having been formed by applying a Cu paste to the chip element and having a top part covering the end face of the chip element and a side part covering a portion of the side face of the chip element; and a second electrode layer having been formed by adhering a Cu sheet to the first electrode layer and covering the top part of the first electrode layer while covering the side part of the first electrode layer so as to expose a portion thereof; and still further wherein the first electrode layer has a higher glass content than does the second electrode layer.

3. The ceramic electronic component according to claim 2, wherein the second electrode layer contains no glass.

4. A method for producing a ceramic electronic component which comprises a chip element of a rectangular parallelepiped shape having internal electrodes embedded therein and terminal electrodes covering end faces of the chip element in which the internal electrodes are exposed and being electrically connected to the internal electrodes, said method comprising:

a step of preparing the chip element;

a step of forming a ground electrode layer by covering the end face of the chip element with a conductive paste comprised of Cu followed by firing, to form the ground electrode layer in the terminal electrode;

a step of forming a solder layer by covering the entirety of the ground electrode layer with a molten lead-free solder based on five elements of Sn—Ag—Cu—Ni—Ge to form the solder layer in the terminal electrode; and a step of forming a diffusion layer by allowing Ni to diffuse between the ground electrode layer and the solder layer to form the diffusion layer in the terminal electrode.

5. The method for producing a ceramic electronic component according to claim 4, wherein the terminal electrode covers the end face of the chip element while covering a portion of a side face of the chip element that is orthogonal to the end face, and further wherein the step of forming a ground electrode layer comprises:

a step of forming a first electrode paste layer by applying a Cu paste to the chip element to form the first electrode paste layer so that the first electrode paste layer has a top part covering the end face of the chip element and a side part covering a portion of the side face of the chip element;

a step of forming a second electrode paste layer by adhering a Cu sheet to the first electrode paste layer to cover the top part of the first electrode paste layer while covering the side part of the first electrode paste layer so as to expose a portion thereof, to form the second electrode paste layer having a lower glass content than does the first electrode paste layer; and a step of firing the first electrode paste layer and the second electrode paste layer to form the first electrode layer and the second electrode layer.

6. The method for producing a ceramic electronic component according to claim 4, wherein the formation of the solder layer in the step of forming a solder layer and the formation of the diffusion layer in the step of forming a diffusion layer are carried out simultaneously by bonding the molten lead-free solder of the five elements to the ground electrode layer.

* * * * *